Dec. 1, 1970 — W. G. ERICKSON — 3,543,490
FLEXIBLE ROTARY MOWER
Filed Nov. 8, 1968 — 3 Sheets-Sheet 1
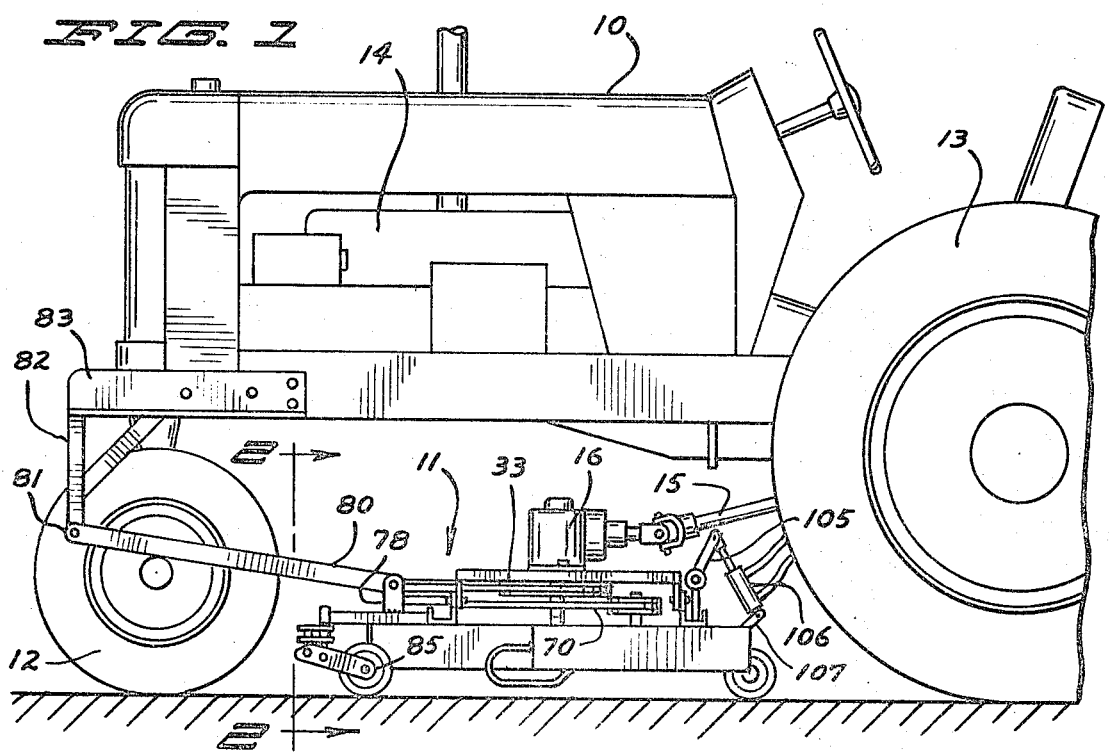
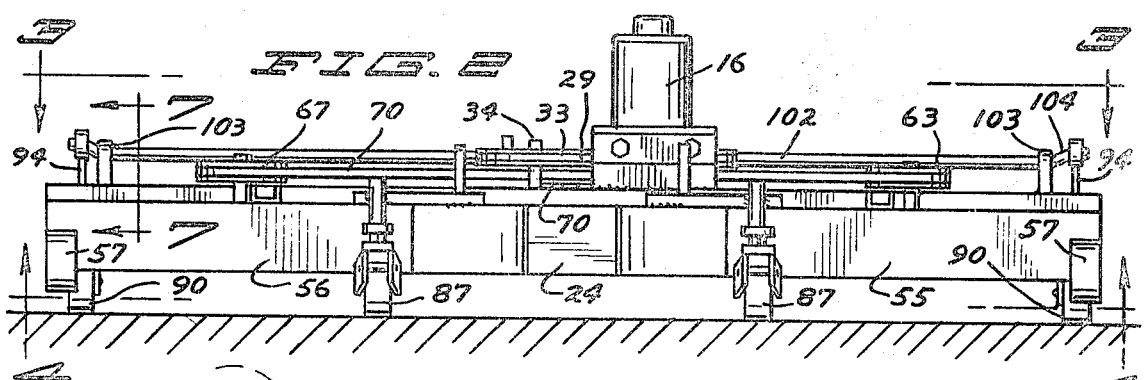
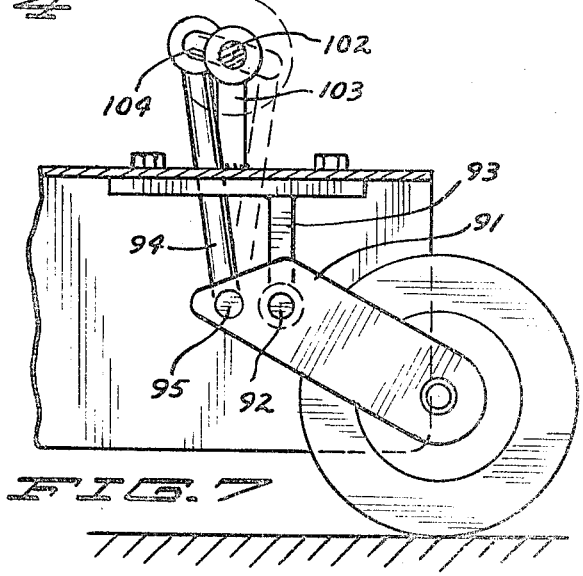
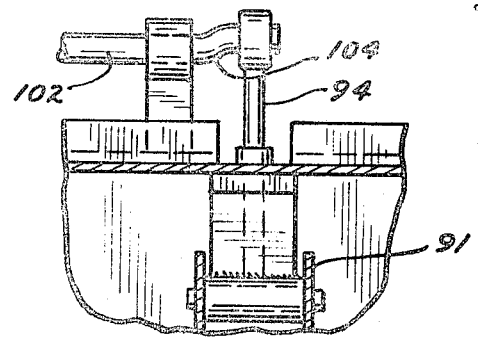
INVENTOR.
WALDO G. ERICKSON
BY
Rugger Peterson Johnson & Westman
ATTORNEYS

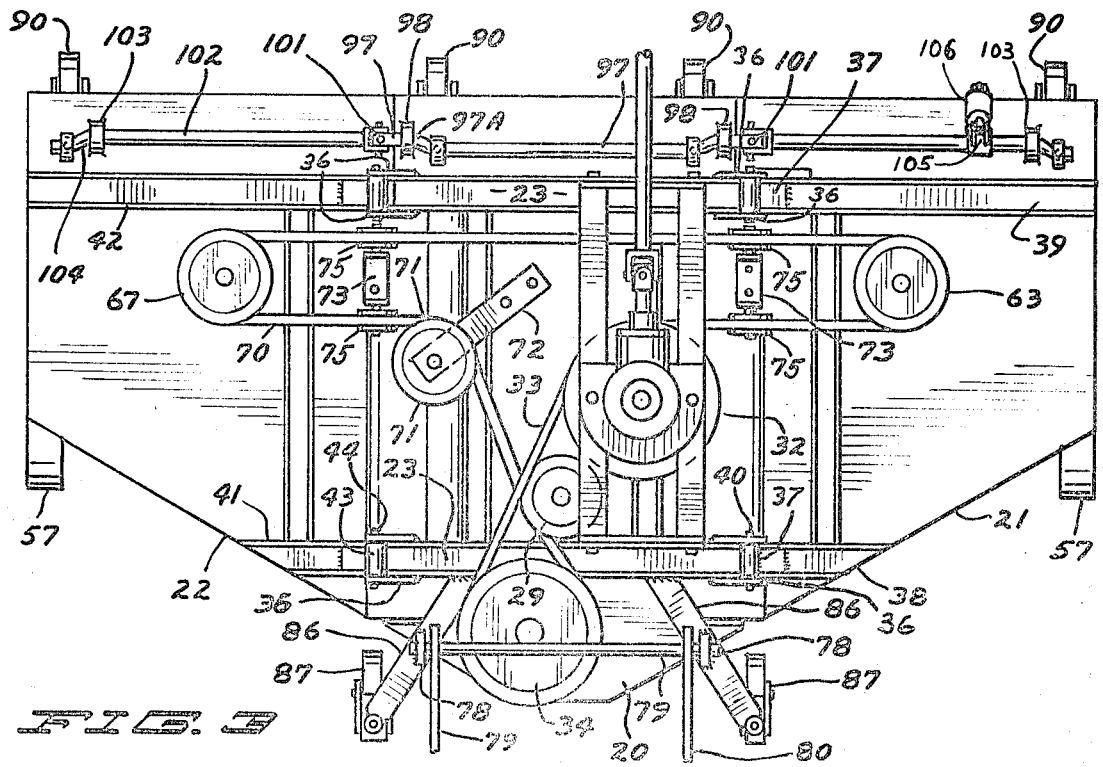

Dec. 1, 1970

W. G. ERICKSON 3,543,490

FLEXIBLE ROTARY MOWER

Filed Nov. 8, 1968

INVENTOR.
WALDO G. ERICKSON

BY
Rugger, Peterson, Johnson & Westman
ATTORNEYS

United States Patent Office 3,543,490
Patented Dec. 1, 1970

3,543,490
FLEXIBLE ROTARY MOWER
Waldo G. Erickson, Rte. 2, Springfield, Minn. 56087
Filed Nov. 8, 1968, Ser. No. 774,474
Int. Cl. A01d 35/26
U.S. Cl. 56—25.4
13 Claims

ABSTRACT OF THE DISCLOSURE

A multiple blade rotary type mower comprising a plurality of sections which have hinged outer portions that permit the mower to mow irregular surfaces. The mower is belt driven, and the belts are made so that as the sections pivot, the belts do not change in length. Further, adjustable guide wheels are provided to set the height of cut of the mower.

BACKGROUND OF THE INVENTION

Field of the invention

The present invention relates to multiple section mowers using rotary blades as cutting elements.

Prior art

Many multiple blade rotary mowers have been advanced, for example, in Pat. No. 3,339,353 a multiple section gang mower with removable outboard sections is shown. A single pivot mounting for under the tractor multiple gang mower is shown in Pat. No. 3,118,266. However, one of the problems of using multiple section mowers is that the outer sections should float or be allowed to follow irregular contours in order to get an even job of mowing. In order to do this, the drive means have always been a problem. For example, in Pat. No. 2,952,961 telescoping shafts are used for driving the outer sections, but these are subject to binding and do not operate uniformly at different angles of operation.

SUMMARY OF THE INVENTION

The present invention relates to a flexible multiple gang mower having a belt drive element for outer gangs which are positioned so they will not change in length when the sections flex with respect to the main mounting section. Further, gauge wheels having quick adjustable means for maintaining a uniform height of cut of the mower are provided. The mower itself is supported underneath a tractor, in the form shown, and is fully supported on the gauge wheels for maintaining the height of cut. The mower could be self-propelled, if desired, and the same drive for the outer blades as that shown would be used. The mounting to the tractor is as shown on pivots so that the mower can follow irregularities in the ground as it moves along the ground, and the outer sections will flex without changing the length of the drive belts to conform to transverse irregularities.

BRIEF DESCRIPTION OF THE DRAWINGS

FIG. 1 is a side elevational view of a tractor having a mower made according to the present invention installed thereon;

FIG. 2 is a front elevational view taken as on line 2—2 of FIG. 1;

FIG. 3 is a top plan view taken as on line 3—3 in FIG. 2 with the top idler sheaves 74 omitted;

FIG. 4 is a bottom plan view taken as on line 4—4 in FIG. 2;

FIG. 7 is a fragmentary sectional view taken as on line 7—7 in FIG. 2; and

FIG. 8 is a fragmentary front view of the device of FIG. 7.

DESCRIPTION OF THE PREFERRED EMBODIMENT

Figure 5:
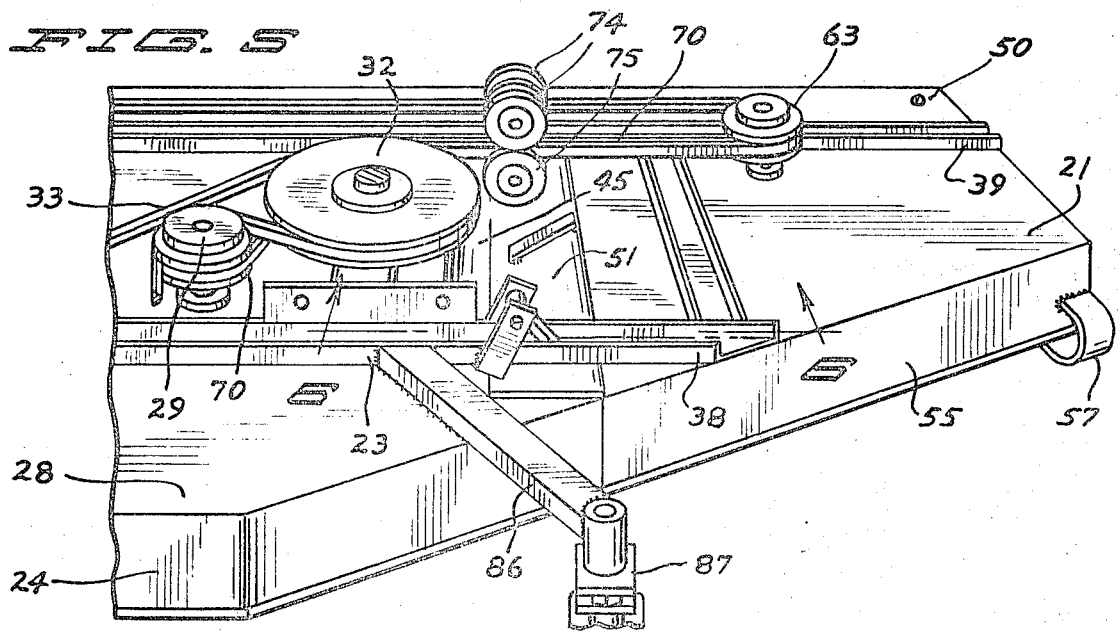
FIG. 5 is a fragmentary perspective view of the top of the mower showing details of drive elements.

A conventional farm tractor 10 of the tricycle type (narrow front wheels) is shown mounting a mower assembly generally indicated 11 made according to the present invention. The tractor has front wheels 12 and rear drive wheels 13, as well as an engine 14 for power. The tractor has a conventional power take-off, and a front directed shaft for the power take-off is used to drive a power shaft 15 that transmits power to a gear box 16 mounted on the mower assembly. The mower can be self-propelled if desired, or mounted on a garden tractor. The mower assembly comprises three sections, including a main center section 20, and outer sections 21 and 22 extending to opposite sides of the center section 20. The center section has a main frame made up of front and rear members 23 which are joined together with other frame members. A top plate 28 attached to the members has a depending skirt 24 in the front to shield the cutting blade 25.

The blade 25 is mounted onto a spindle shaft 26 which is rotatably mounted in a suitable hub 27 (see FIG. 4) and extends up through the top plate 28 of the center section. On top of the top plate 28, a double grooved V-belt sheave 29 is drivably mounted onto the shaft 26. The gear box 16 has an output shaft on which another double grooved V-belt drive sheave 32 is drivably mounted. The drive sheave drives a V-belt 33 that goes through the upper groove of the sheave 29 and around an idler sheave 34 that is rotatably mounted on the center section. When the power shaft 15 is rotating, the gear box output shaft 16 will drive the sheave 32, driving the V-belt 33 and in turn driving double sheave 29 to rotate the blade 25 for cutting the grass.

The center mower section is used for mounting the outer mower sections 21 and 22 which extend out to the sides.

As shown, the front and rear cross members 23 for the center section each mount separate spaced apart pairs of arms or plates 36 at each end thereof. Thus, there are spaced apart plates 36 at each end of each of the cross members 23. For mounting the mower section 21, arms 37 are fixedly attached to frame members 38 and 39 on the outer section, respectively, and pins 40 pass through provided openings in the aligning pairs of plates 36 and openings in the arms 37 to provide a pivotal mounting about a common axis for the outer section 21. Thus, the cutter section is free to pivot about the pins 40 upwardly from a generally horizontal plate, and downwardly slightly to accommodate for irregularity in the ground. The pivot axis of pins 40 is spaced above the plane of the top plate 28.

The outer mower section 22 on the opposite side of the center section 20 from section 21 has front and rear cross members 41 and 42, respectively and these members in turn mount arms 43 which pass between the pairs of plates 36 on that side of the center section 20. Pins 44 are used for passing through openings in the spaced apart pairs of plates 36 and the arms 43 to pivotally mount this mower section 22 to the center section 20. The axis of pins 44 is above the plane of the top plate 28 as well.

Figure 6:
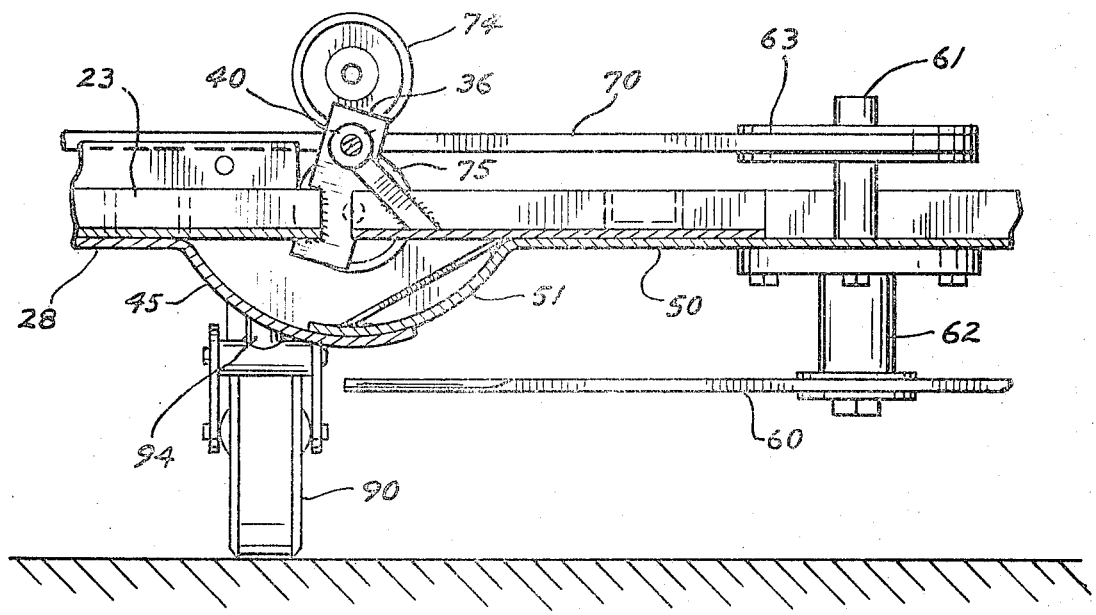
FIG. 6 is a sectional view taken as on line 6—6 in FIG. 5.

The center section top plate 28, as shown, has separate part cylindrical portion 45 on opposite sides thereof. These part cylindrical portions 45 go downwardly from the plane of a plate 28 and are formed in an arc having an axis coincident with the axes of the pivot pins between the respective outer sections and the center section. In other words, the arc for each portion 45 has its center on the same axis as the axis of the pin 40 or 44. The top plate 50 for the outer mower section 21 (see FIG. 6) has a part cylindrical portion 51 that fits above the corresponding part cylindrical portion 45 so that these two part cylindrical portions will slide past each other as the section 21 of the mower pivots about the axis of the pins 40. The part cylindrical portions thus form concentric overlapping shields for the joint between the mower sections. This can also be seen in the bottom plan view of FIG. 4.

The plate 53 forming the top of the mower section 22 also has a part cylindrical portion 54 formed therein mating with the part cylindrical portion 45 adjacent the mower section 22. These part cylindrical portions are formed with their centers at the axis of the pin 44 so that when the section 22 moves about the axis of the pins 44 the part cylindrical portions 45 and 54 will also move past each other, and will not leave any gap when the outer section 22 pivots.

The mower section 21 has depending skirts 55 around the front and outer side thereof and the mower section 22 has depending skirts 56 around the front and outer side thereof as well. The skirts 55 and 56 overlap the front skirt 24 of the center section so that there is no opening here either when the outer mower sections 21 or 22 move up because of ground irregularity. The mower sections 21 and 22 also each have outer guide shoes 57.

The section 21 has a rotary cutting blade 60 which is drivably mounted onto a shaft 61. The shaft 61 is rotatably mounted in a housing 62 that is in turn mounted to the plate 50. The shaft 61 extends through the plate 50 and has a V-belt drive sheave 63 drivably mounted thereon above the top of the plate 50.

The mower section 22 has a cutting blade 64 that is mounted onto a shaft 65 which in turn is rotatably mounted onto a hub 66 attached to the plate 53. The shaft 65 extends above the top of the plate 53 and has a V-belt sheave 67 drivably mounted thereon. A single belt 70 is used for driving the two blades 60 and 64. The belt 70 is wrapped around the lower groove of the double groove sheave 32, and also around the lower groove of the double groove sheave 29, and thence passes over an idler sheave 71 that is mounted onto a bracket 72 in a suitable manner. The belt is then threaded around the sheaves 63 and 67 to drive them.

In order to insure that the belt 70 does not become loose when the section 21 or 22 pivot with respect to the center section, a unique guide arrangement is utilized. A separate bracket 73 is mounted on each side of the center section 20 of the mower. The brackets 73 each mount four idler sheaves. There is a pair of spaced apart top idler sheaves 74 on each of the brackets and a pair of vertically aligning spaced apart bottom idler sheaves 75 on each of the brackets. The top and bottom idler sheaves align in a plane on each side of the brackets. The belt reaches or portions are positioned so that the belt will pass between a top and bottom sheave 74 and 75 (they are sandwiched between) wherever they cross the junction between the center section and one of the outer sections of the mower. Also, the sheaves 74 and 75 are positioned on the brackets 73 (they are rotatably mounted on the bracket) so that the center of the belt 70 lies along the axis of the respective pins 44 and 40. Thus, when the section 21, for example, pivots about its pins 40, the sheaves 74 and 75 guiding each of the portions of the belt 70 going to sheave 63, hold the belt so that the belt actually bends about the same axis as the axis of pins 40 as the sheave 63 moves up. This results in no lengthening of the belt because the actual center of pivot of the belt will be right in line with the center of pivot of the section. The belt will wrap around the sheaves 74 when the outer section pivots up, and around the lower sheaves 75 when the outer section goes into a depression and pivots down. The sheaves 74 and 75 are small so that in ordinary operation the belt 70 continues to be tight enough to drive when the sections are in a horizontal position and are not overly tight or loose when the outer sections pivot.

The same action occurs when the section 22 pivots about the axis of pins 44. The reaches or portions of the belt passing between the upper and lower sheaves 74 and 75 on the brackets 73 adjacent the section 22 of the mower hold the belt so that it bends about the same axis as the outer section 22. The concentric shield portion 45 and portions 54 and 51 move about the same axes as their respective mower section so that the shields remain effective when the outer sections pivot. It should be noted that the sheaves 63 and 67 and guide sheave 71 are positioned so the belt reaches or portions cross the axes of the pins 44 and 40 at right angles. The guides permit the belt to flex without substantial loosening or tightening as the sections pivot.

The mower assembly as described can be either self-propelled, or mounted on the tractor. As shown, brackets 78 are mounted onto the center section adjacent the front edge thereof, and a pivot shaft 79 goes between the brackets. Links 80 are mounted onto the shaft 79 and extend forwardly. The links 80 are positioned on opposite sides of the front wheels 12 of the tractor and are pivotally mounted as at 81 to depending legs 82 extending from frame 83 that are mounted onto the side frames of the tractor 10. The mower assembly 11 thus can move up and down about the pivots of shaft 79 and pivot 81 and be drawn over the ground through the links 80.

The mower assembly is supported through the use of front caster wheels 85, that are mounted onto arms 86 and extend outwardly from the center section of the mower and are fixed to the front cross member 23. The rear portions of the mower assembly are supported through the use of gauge wheels 90. The gauge wheels 90 are positioned so that there are two gauge wheels on the center section 20, and one each adjacent the outer edges of the outer sections 21 and 22, respectively. Each of the gauge wheels 90 is rotatably mounted between a pair of plates 91 that are formed into a common assembly and pivotally mounted as at 92 (see FIG. 7) to a separate bracket 93 depending from the respective top plates of the mower. The brackets 93 are fixed in position. A separate compression link 94 is pivotally mounted as at 95 to each of the assemblies of plates 91 and extends through a provided opening in the respective top plate.

The links 94 for the gauge wheels 90 on the center section of the mower 20 pass through the top plate 28 through provided openings, and are mounted onto a cam or offset portion 97 of a shaft 97A. The shaft 97A has end portions that are rotatably mounted in supports 98 adjacent the opposite sides of the center section, and the end portions of the shaft extend outwardly. Universal joints 101 are mounted on opposite ends of the shaft 97A and these engage outer section shafts 102 that extend across the respective outer sections 21 and 22 and are rotatably mounted respectively in supports 103. The shafts 102 each have cam portions 104 corresponding in offset to portion 97 that in turn are used for mounting the upper ends of the links 94 for the outer wheels 90.

The shafts 97A and 102 are connected through the universal joints and form a shaft assembly that extends across the mower.

A lever 105 is fixed onto the shaft assembly, and preferably is fixed onto one of the shafts 102 and a hydraulic cylinder 106 is mounted to a bracket 107 attached to the mower section and also attached to the outer end of the lever 105. By controlling the hydraulic cylinder 106 and extending a retracting cylinder in a conventional manner, the shaft assembly can be rotated, and this will in turn rotate the cam or offset section 97 and the other cam section and will simultaneously adjust the height of the gauge wheels 90 in a uniform manner. The universal joints 101 are made so that they will align with the axes of the pins 44 and 40 so the adjustment can be made by rotating the transverse cam shaft even though the sections 21 or 22 may be pivoted about their respective pins and also to permit flexing of the section without bending the shaft. Thus, the shafts 97A and 102 are joined to make a complete cam shaft assembly with camming sections. They are rotated about common axes and their supports 98 and 103 and the cam sections are the same size so that they will act on the links in the same manner and cause the same amount of adjustment to each of the gauge wheels 90. A hand lever and quadrant can be used for adjustment in place of the hydraulic cylinder, if desired.

The rear portions of the center section 20 and the outer sections 21 and 22 are without skirts and this permits discharge of grasses. A plurality of baffles are provided on the bottom surface of the top plates of the mower sections for directing the grass as the grass is discharged out toward the rear.

In section 22 there is a corner baffle 110 extending from the side skirt 56 rearwardly to the front of the gauge wheel 90 on that particular mower section, and then there is another baffle 111 that is attached to the part cylindrical wall portion 54 adjacent the rear portions thereof and directs the grass into more or less a windrow and away from the gauge wheel 90. The baffles 110 and 111 extend downwardly farther than the blade 64 so that the grass being cut by the blade will be directed properly.

In the center section, there is a long baffle 112 that is relieved so that it passes between the blade and the top wall 28 of the center section in the areas where the blade rotates, and to the rear of the place where the blade rotates extends downwardly farther than the blade. Because of the direction of rotation of the blade as shown by the arrow in FIG. 4, grass being cut will be carried with the blade around until it strikes the baffle 112 and then will be directed rearwardly along the wall of the baffle 112 and out through the back portions of the mower. In addition, there are somewhat higher deflectors 113 to protect the gauge wheels that are attached to the center section of the mower.

On the outer section 21, there are baffles 114 and 115 positioned to deflect the grass rearwardly out through the opening to the rear of the mower. Also, the baffle 114 protects the outer gauge wheel 90 on the outer section 21.

The caster wheels at the front of the mower can be vertically adjustable, if desired, and when the mower is used as a self-propelled unit, the caster wheels at the front would probably not be necessary. Normally some type of height adjustment would also be provided at the front.

The present device thus gives a feature of having a belt drive for a multiple section mower wherein the sections are hinged relative to each other and wherein the belt is mounted so that it does not lengthen or shorten substantially as the sections hinge relative to each other. Further, quick height adjustments through the use of caster wheels on a multiple section mower which operate from a common cam shaft greatly aids the operation of such a mower so that proper adjustments can be made quickly and efficiently in all of the sections.

What is claimed is:

1. A mower assembly comprising a plurality of housing sections and having at least two separate cutting members rotating about upright axes and being mounted on separate mower housing sections, means to pivotally mount said housing sections to each other about a pivot axis, drive means on one of said housing sections for driving said blades about their upright axis and including an endless flexible member passing from one of said housing sections to the other to drive the other of said blades, and guide means on one of said sections guiding said endless flexible members to bend about a point substantially coinciding with the pivot axis between said housing sections whenever said sections pivot relative to each other.

2. The combination as specified in claim 1 and bracket means on said housing sections cooperating together to form said pivot axis, said pivot axis being spaced above the housing section.

3. The combination as specified in claim 1 wherein said endless flexible member comprises belt means, and guide means positioning said belt means to move in a plane substantially parallel to and coincident with the pivot axis between said housing sections.

4. The combination as specified in claim 3 wherein said guide means comprise a pair of rotatably mounted idler pulleys, said idler pulleys being positioned on the top and bottom, respectively, of said belt means in the area where the pivot axis between said sections intersects said belt means.

5. The combination as specified in claim 1 and shield means between said mower sections comprising a first part cylindrical wall portion on a first mower housing section, and a concentric part cylindrical wall portion on a second of said mower housing section, said part cylindrical wall portions being slidably positioned relative to each other, the axes of said part cylindrical wall portions being substantially coincidental with the axis of pivot between said two sections.

6. The combination as specified in claim 5 wherein said part cylindrical wall portions are below the general plane of the top of the housing sections.

7. The combination as specified in claim 1 wherein portion of said guide means is positioned in the depressions formed by said part cylindrical wall portions.

8. The combination as specified in claim 1 wherein there are three mower housing sections, a center section comprising the first section, and two outer sections comprising second and third sections, each of said outer sections being hinged to said center section about pivot axes spaced above the plane of the top of said center section, and each of said outer sections having a separate grass cutting blade rotatably mounted thereon, a common belt driving the blades in said outer sections, and means positioning said belt so that said belt portions leading to each of the outer sections bends about the same axis at the respective outer section to which the belt is directed whenever that outer section pivots with respect to the center section.

9. The combination as specified in claim 8 and means to position said belt so that the portions thereof crossing the pivot axis between the center sections and the outer sections are positioned substantially at right angles to the pivot axes where they cross the respective axes.

10. The combination as specified in claim 8 and a plurality of spaced apart transversely aligned gauge wheel means mounted on said mower housing sections, said guage wheel means including wheel supports pivotally mounted to said mower housing sections, link means for controlling movement of said wheel supports about their pivotal mounting, and a common control shaft assembly rotatably mounted on the housing sections to control all of the gauge wheel means on all of the sections, said shaft assembly having eccentric means controlling positioning of the respective link means as the shaft is rotated, and means to hold and control said shaft assembly in its rotational position.

11. The combination as specified in claim 10 wherein said shaft assembly comprises three sections, one of said sections being rotatably mounted on each of said mower housing sections, and universal joint means between adjoining shaft sections substantially coinciding with the axes of pivoting between the center mower housing section and the outer housing sections.

12. In a mower assembly having a plurality of sections pivotally connected together, each section having a cutting blade and power means for driving the cutting blades, the improvement comprising a plurality of spaced apart transversely aligned gauge wheel means mounted on said mower sections, said guage wheel means including individual wheel uspports pivotally mounted to each of said sections, link means connected to said wheel supports for controlling movement of said wheel supports about their pivotal mountings, and a common control shaft assembly rotatably mounted on the mower assembly to control all of the guage wheel means relative to all of the sections, said shaft assembly having eccentric means also connected to said link means for controlling positioning of the respective link means as the shaft is rotated, and means to hold and control said control shaft in its rotational position.

13. The combination as sepcified in claim 12 wherein there are three mower sections in the mower assembly pivotally mounted together about longitudinal axes, and said control shaft assembly comprises three sections, one of said control shaft sections being rotatably mounted on each of said mower sections, and universal joint means connecting adjoining control shaft sections substantially coinciding with the axes of pivoting between the mower sections.

References Cited
UNITED STATES PATENTS

| | | | |
|---|---|---|---|
| 2,801,510 | 8/1957 | Colburn | 56—25.4 |
| 2,952,961 | 9/1960 | Engler | 56—25.4 |
| 3,077,065 | 2/1963 | Samways et al. | 56—25.4 |
| 3,118,266 | 1/1964 | Colburn | 56—25.4 |
| 3,339,353 | 9/1967 | Schreyer | 56—6 |
| 3,461,654 | 8/1969 | Plamper | 56—25.4 |
| 3,483,684 | 12/1969 | Price | 56—25.4 |

RUSSELL R. KINSEY, Primary Examiner

U.S. Cl. X.R.

56—6